US011509793B2

(12) United States Patent
Nagasaki (10) Patent No.: US 11,509,793 B2
(45) Date of Patent: Nov. 22, 2022

(54) SERVERS AND NON-TRANSITORY COMPUTER READABLE STORAGE MEDIUM FOR REGISTERING AND MONITORING CONSUMABLES (71) Applicant: BROTHER KOGYO KABUSHIKI KAISHA, Nagoya (JP)

(72) Inventor: Takeshi Nagasaki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 1274 days.

(21) Appl. No.: 15/798,508

(22) Filed: Oct. 31, 2017

(65) Prior Publication Data

US 2018/0176413 A1 Jun. 21, 2018

(30) Foreign Application Priority Data

Dec. 15, 2016 (JP) .............................. JP2016-243730

(51) Int. Cl.
*H04N 1/327* (2006.01)
*G06Q 30/06* (2012.01)
(Continued)

(52) U.S. Cl.
CPC .......... *H04N 1/32765* (2013.01); *B41J 29/38* (2013.01); *G06F 3/121* (2013.01);
(Continued)

(58) Field of Classification Search
CPC . G06Q 30/0601–0645; H04N 1/32765; H04N 2201/0082; H04N 2201/3205
(Continued)

(56) References Cited

U.S. PATENT DOCUMENTS 8,570,568 B2 10/2013 Pangrazio, III
10,592,892 B2 * 3/2020 Bhatia ................... G06F 3/1239
(Continued)

FOREIGN PATENT DOCUMENTS

CN 103412730 A 11/2013
CN 104249558 A 12/2014
(Continued)

OTHER PUBLICATIONS

Davies, Chris. "HP ePrint web-connected printer service debuts" (2010) Slashgear.com (Year: 2010).*
(Continued)

*Primary Examiner* — Allison G Wood
*Assistant Examiner* — Katherine A Barlow
(74) *Attorney, Agent, or Firm* — Scully Scott Murphy and Presser (57) ABSTRACT A server registers, into a first memory, user identification information and service information in a condition where a connection between the server and a target device via the Internet has not been established. The server registers, into a second memory, first device identification information in association with the user identification information and the service information registered in the first memory after receiving the first device identification information. After the connection between the server and the target device via the Internet has been established for a first time, the server causes a service providing server to provide the service to the user using the user identification information and the service information in the first memory in response to receiving the device identification information from a target device matching the first device identification information.

9 Claims, 5 Drawing Sheets (51) Int. Cl.
*G06Q 10/08* (2012.01)
*H04N 1/32* (2006.01)
*B41J 29/38* (2006.01)
*H04N 1/00* (2006.01)
*G06F 3/12* (2006.01)

(52) U.S. Cl.
CPC .......... *G06F 3/1203* (2013.01); *G06F 3/1231* (2013.01); *G06F 3/1235* (2013.01); *G06F 3/1287* (2013.01); *G06Q 10/087* (2013.01); *G06Q 30/0635* (2013.01); *H04N 1/00344* (2013.01); *H04N 1/32122* (2013.01); *H04N 2201/0082* (2013.01); *H04N 2201/3205* (2013.01)

(58) Field of Classification Search
USPC ................................................ 705/26.1–27.2
See application file for complete search history.

(56) References Cited

U.S. PATENT DOCUMENTS

| | | | | |
|---|---|---|---|---|
| 2001/0042022 | A1* | 11/2001 | Kirkpatrick | G06Q 30/02 705/302 |
| 2009/0077278 | A1* | 3/2009 | Kuroda | G06F 3/121 710/58 |
| 2009/0190166 | A1* | 7/2009 | Nakamura | G06F 3/1219 358/1.15 |
| 2010/0198986 | A1* | 8/2010 | Andersen | G06F 16/338 709/244 |
| 2011/0191198 | A1* | 8/2011 | Rise | G06Q 30/0601 705/26.1 |
| 2013/0145221 | A1 | 6/2013 | Kaneko | |
| 2015/0002884 | A1 | 1/2015 | Okumura et al. | |
| 2015/0355865 | A1* | 12/2015 | Ohara | G06F 3/1297 358/1.15 |
| 2016/0086189 | A1* | 3/2016 | Chitre | G06Q 30/0633 705/26.8 |
| 2016/0292550 | A1 | 10/2016 | Kawai | |
| 2016/0292629 | A1 | 10/2016 | Matsuda | |

FOREIGN PATENT DOCUMENTS

| | | |
|---|---|---|
| EP | 1 326 381 A2 | 7/2003 |
| EP | 1 331 521 A2 | 7/2003 |
| EP | 1 326 381 A3 | 10/2009 |
| JP | 2016-193592 A | 11/2016 |
| JP | 2016-194770 A | 11/2016 |

OTHER PUBLICATIONS

Rossman, Jim. "Review: HP wants you to pay monthly for ink, and maybe you should" Phys.org (Year: 2014).*
Bishop, Todd. "These printers will automatically order their own ink from Amazon, as new replenishment service debuts" GeekWire.com (Year: 2016).*
Extended European Search Report dated Jun. 6, 2018 received in related application 17200423.6.
Official Action dated Aug. 20, 2021 received in Chinese Patent Application No. CN 201711248439.6 together with an English language translation.

* cited by examiner

Fig.1

SERVERS AND NON-TRANSITORY COMPUTER READABLE STORAGE MEDIUM FOR REGISTERING AND MONITORING CONSUMABLES

CROSS-REFERENCE TO RELATED APPLICATION

This application claims priority from Japanese Patent Application No. 2016-243730 filed on Dec. 15, 2016, the content of which is incorporated herein by reference in its entirety.

TECHNICAL FIELD

The present disclosure relates to a server for enabling provision of a service to a user of a target device by a service providing server.

BACKGROUND

A system for enabling automatic delivery of a new ink cartridge to a user of a printer when a remaining amount of ink in an ink cartridge currently mounted in the printer becomes low is known. In order to receive such a service, the user registers various pieces of information, e.g., user information and printer information, in an information management server. More specifically, under circumstances where a personal computer ("PC"), the printer, and the information management server are communicable with each other via the Internet, the user registers user information in the information management server by operating the PC, and then causes the printer to transmit its serial number and product name to the information management server by operating the printer. Through such operation events, the user registers the printer information in the information management server in association with the user information. Thereafter, the user causes the PC to transmit a contract request to the information management server by operating the PC. In response to this, the information management server transmits contract start information to the printer, and the information management server transmits dispatch information including identification information of an ink cartridge to a dispatch management server.

SUMMARY

In the foregoing technique, under circumstances where the printer and the information management server are communicable with each other via the Internet, all necessary pieces of information (i.e., the user information and the printer information) for the user to obtain a particular service may be registered in the information management server in association with each other. Therefore, unless the printer is connected to the Internet, the user is not allowed to start a process of registration of information of the target device in the information management server in association with each other.

In the present specification, the disclosure provides for a technique that enables starting a process for registration of information of the target device, in a server, in association with each other, with no need for the user to connect a target device to the Internet.

One illustrative aspect of the disclosure may provide a server comprising: a controller configured to perform: receiving, in a condition where a connection between the server and a target device via the Internet has not been established, a user registration request for requesting a registration of a user of the target device via the Internet; registering, into a first memory, user identification information for identifying the user of the target device; receiving, in the condition where the connection between the server and the target device via the Internet has not been established, a service registration request for requesting a registration of a service via the Internet; registering, into the first memory, service information for receiving a provision of the service from a service providing server, the service information included in the service registration request; receiving, in the condition where the connection between the server and the target device via the Internet has not been established, a first device identification information for identifying the target device in response to the first device identification information being sent from a vendor's terminal via the Internet; registering, into a second memory, the first device identification information in association with the user identification information and the service information registered in the first memory after receiving the first device identification information; receiving, in the condition where the connection between the server and the target device via the Internet has been established for a first time, a device identification information from the target device via the Internet; determining whether the device identification information received from the target device matches with the first device identification information registered in the second memory; and after determining that the device identification information matches with the first device identification information, causing the service providing server to provide the service to the user using the user identification information and the service information in the first memory, the user identification information and the service information being in association with the first device identification information.

According to the above-described configuration, under circumstances where the server is not communicable with the target device via the Internet, in response to receipt of the first device identification information from the vendor's terminal, the server may register the user identification information, the service information, and the first device identification information in association with each other. As described above, the server may register necessary pieces of information for the user to obtain a service (e.g., the user identification information, the service information, and the first transmission identification information) in association with each other with no need for the user to connect the target device to the Internet. After the server becomes communicable with the target device via the Internet, in response to receipt, from the target device, of the device identification information that matches with the already-registered first device identification information, the server may cause the service providing server to provide the service to the user appropriately by using the user identification information and the service information associated with the first device identification information.

Another illustrative aspect of the disclosure may provide a server comprising: a controller configured to perform: receiving, in a condition where a connection between the server and a target device via the Internet has not been established, a user registration request for requesting a registration of a user of the target device via the Internet; registering, into a first memory, user identification information for identifying the user of the target device; receiving, in the condition where the connection between the server and the target device via the Internet has not been established, a service registration request for requesting an registration of a service via the Internet; registering, into the first memory, service information for receiving a provision of the service, the service information being included in the service registration request; receiving, in the condition where the connection between the server and the target device via the Internet has not been established, a first unique identification information of the target device from a sales server via the Internet; registering, into a second memory, the first unique identification information in association with the user identification information and the service information registered in the first memory; receiving, in the condition where the connection between the server and the target device via the Internet has been established for the first time, a unique identification information from the target device via the Internet; determining whether the unique identification information received from the target device matches with the first unique identification information registered in the second memory; transmitting, to the target device, a transmission request for requesting to transmit consumable component information of the target device in a case where the unique identification information is determined to match with the first unique identification information; receiving the consumable component information from the target device; determining whether the remaining life indicated by the consumable component information is less than or equal to a predetermined level; and transmitting, to the sales server, a dispatch request for requesting to dispatch a consumable component to the user in a case where the remaining life is determined to be less than or equal to the predetermined level.

Another illustrative aspect of the disclosure may provide a function executing device comprising: a controller configured to perform: establishing a connection between the function executing device and a server via the Internet; in response to establishing the connection for a first time, transmitting first device identification information to the server via the Internet without receiving an instruction for transmitting the first device identification information; after transmitting the first device identification information, receiving, from the server, information relating to a service which is provided from a service providing server; and transmitting, to the server, related information relating to the service.

Figure 1:
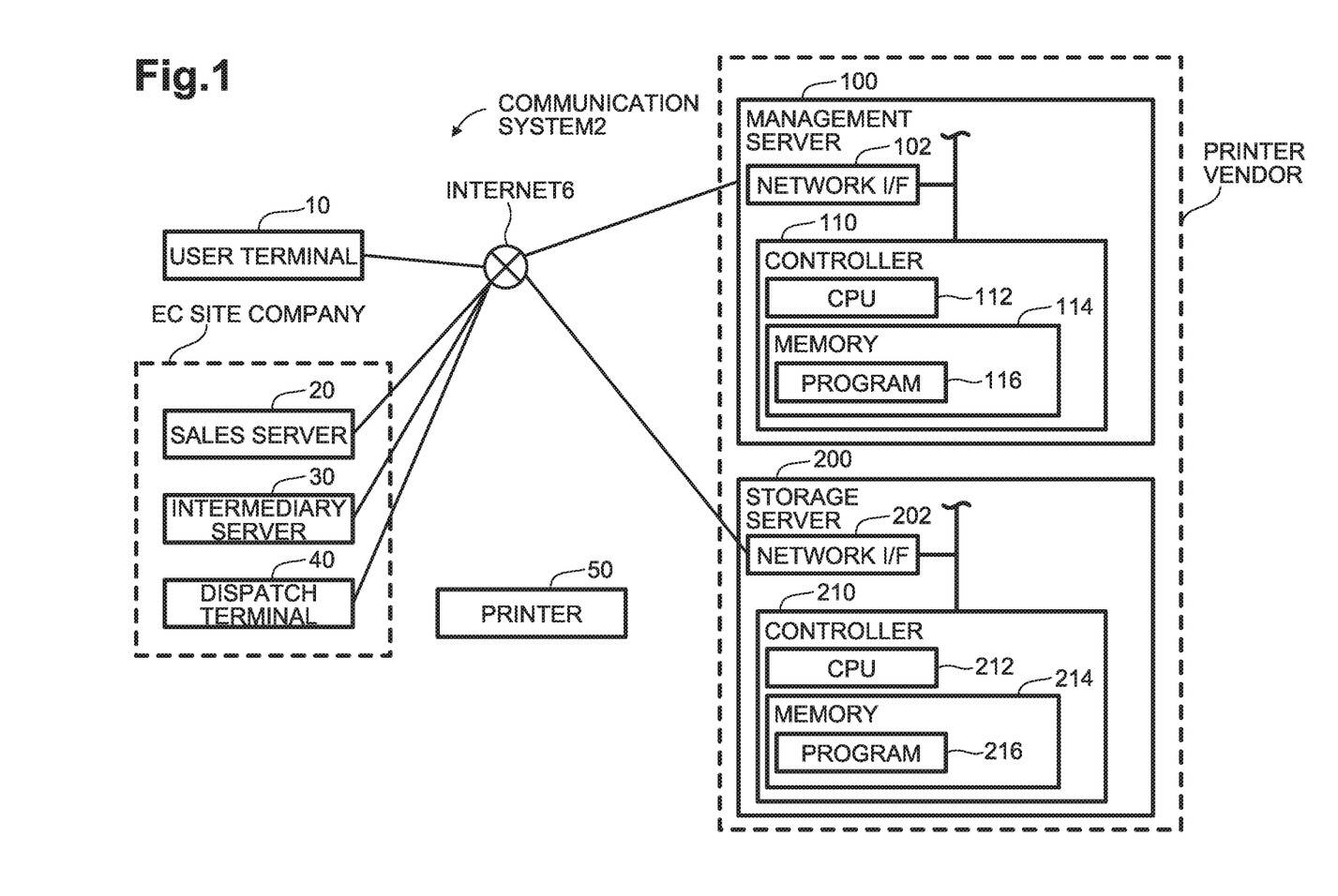
FIG. 1 illustrates a configuration of a communication system.

DESCRIPTION OF EMBODIMENTS (Configuration of Communication System 2; FIG. 1)

As illustrated in FIG. 1, a communication system 2 includes a management server 100, and a storage server 200 that is independent of the management server 100. The servers 100 and 200 may be provided by a vendor of a printer 50. The communication system 2 further includes a sales server 20 and an intermediary server 30. The servers 20 and 30 may be provided by a company that operates an electronic commerce ("EC") site which sells various products including the printer 50. Nevertheless, in other embodiments, the servers 20 and 30 may be provided by the vendor of the printer 50. The servers, 20, 30, 100 and 200 are accessible via the Internet 6.

The communication system 2 further includes a user terminal 10, e.g., a personal computer ("PC"). The user is allowed to access the sales server 20 via the Internet 6 and purchase the printer 50 using the user terminal 10.

The communication system 2 further includes a dispatch terminal 40. In response to user's purchase of the printer 50, a staff member of the EC site company accesses the sales server 20 via the Internet 6 using the dispatch terminal 40 when the printer 50 needs to be dispatched to the user.

The printer 50 may be connected to the Internet 6 by the user after purchased and delivered to the user. Before the printer 50 is connected to the Internet 6, the devices 10, 20, 30, 40, 100, and 200 are communicable with each other via the Internet 6 but not communicable with the printer 50 via the Internet 6. After the printer 50 is connected to the Internet 6, the devices 10, 20, 30, 40, 100, and 200 are communicable with the printer 50 via the Internet 6.

(Configuration of Management Server 100 and Storage Server 200)

The servers 100 and 200 are configured to intermediate a consumable components (e.g., ink cartridges or toner cartridges) delivery service provided to the user of the printer 50 by the sales server 20.

The management server 100 is configured to collect and manage a plurality of pieces of information related to respective printers including the printer 50 and a plurality of pieces of information related to respective users of the corresponding printers. The management server 100 includes a network interface ("I/F") 102 and a controller 110. The network interface 102 and the controller 110 are connected to a bus line (a reference numeral of which is omitted). The network interface 102 is connected to the Internet 6. The controller 110 includes a central processing unit ("CPU") 112 and a memory 114. The CPU 112 executes various processing in accordance with a program 116 stored in the memory 114.

The storage server 200 is configured to store a plurality of pieces of information related to respective printers including the printer 50, and all necessary pieces of information for providing a consumable components delivery service to each user of a corresponding one of the printers. The storage server 200 includes a network interface ("I/F") 202 and a controller 210. The network interface 202 and the controller 210 are connected to a bus line (a reference numeral of which is omitted). The network interface 202 is connected to the Internet 6. The controller 210 includes a CPU 212 and a memory 214. The CPU 212 executes various processing in accordance with a program 216 stored in the memory 214.

(Processes to be executed by Respective Devices 10, 20, 30, 40, 100, and 200; FIGS. 2 to 5)

Hereinafter, referring to FIGS. 2 to 5, processes to be executed by the respective devices 10, 20, 30, 40, 100, and 200 will be described. In this embodiment, all necessary pieces of information for the user to obtain the consumable components delivery service are registered in association with each other in each of the servers 100 and 200 appropriately subsequent to purchase of the printer 50 but prior to establishment of a connection of the printer 50 to the Internet 6 by the user. In response to start of communication between the printer 50 and each of the servers 100 and 200 after the printer 50 is connected to the Internet 6, the consumable components delivery service using all the necessary pieces of information may be started. Hereinafter, the processes to be executed for implementing the consumable components delivery service will be described in detail.

Hereinafter, for easier understanding, each processing executed by the CPU 112 of the server 100 in accordance with the program 116 and each processing executed by the CPU 212 of the server 200 in accordance with the program 216 will be explained while its corresponding server, instead of each CPU itself, is defined as an agent. In the following explanation, communication is performed always via the Internet 6, and therefore, the phrase "via/through the Internet 6" is omitted.

Figure 2:
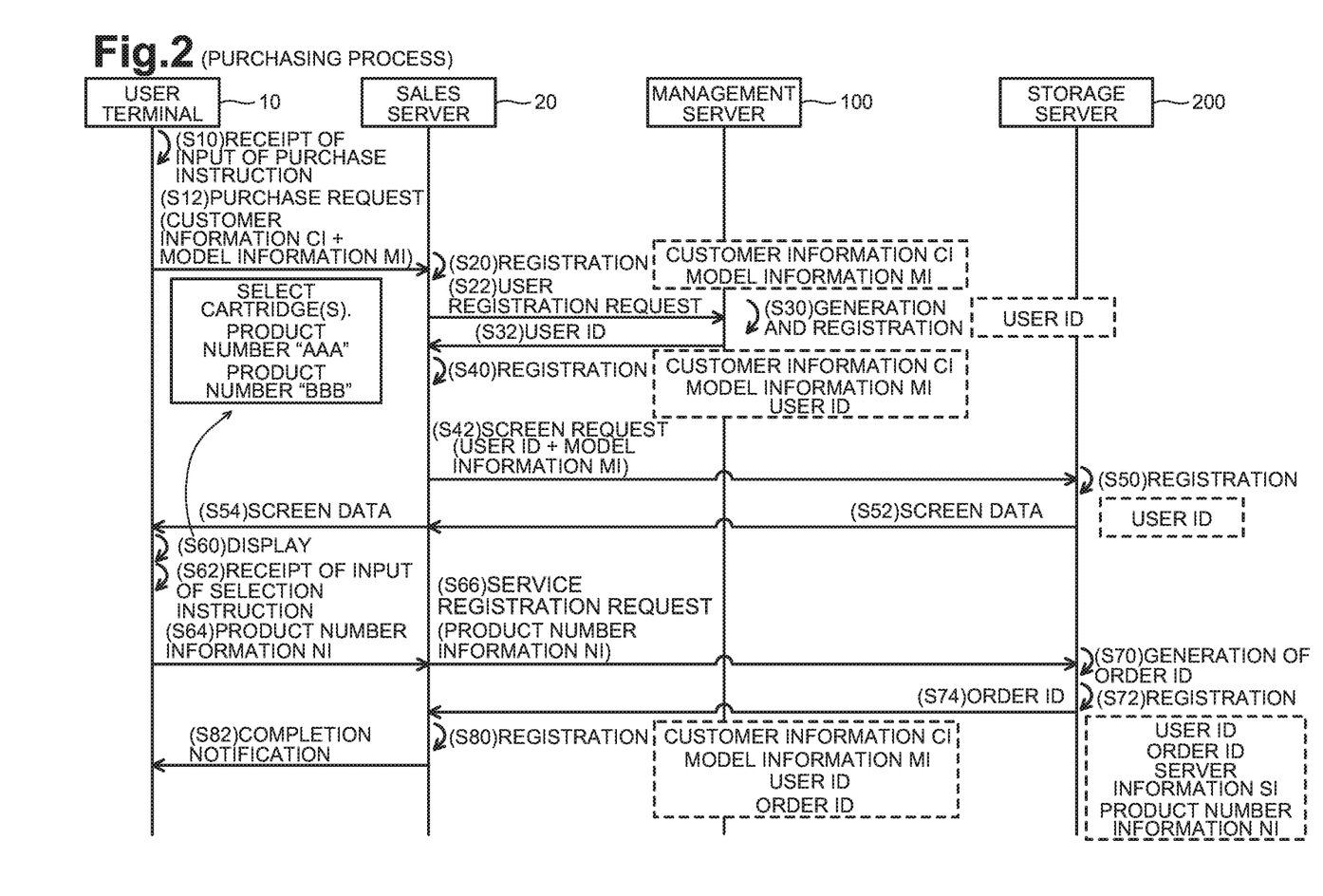
FIG. 2 is a sequence diagram of a purchasing process.

(Purchasing Process; FIG. 2)

Referring to FIG. 2, a process to be executed when the printer 50 is purchased from an EC site (i.e., the sales server 20) will be described. At this moment, the printer 50 is not connected to the Internet 6.

In S10, the user terminal 10 receives user input of a purchase instruction for instructing purchase of a printer 50 while having logged in the sales server 20. In response to this, in S12, the user terminal 10 transmits a purchase request including customer information CI and model information MI to the sales server 20. The customer information CI includes, for example, a user name, address, email address, and billing information (e.g., credit card information). The model information MI includes a model name of the printer 50.

Figure 3:
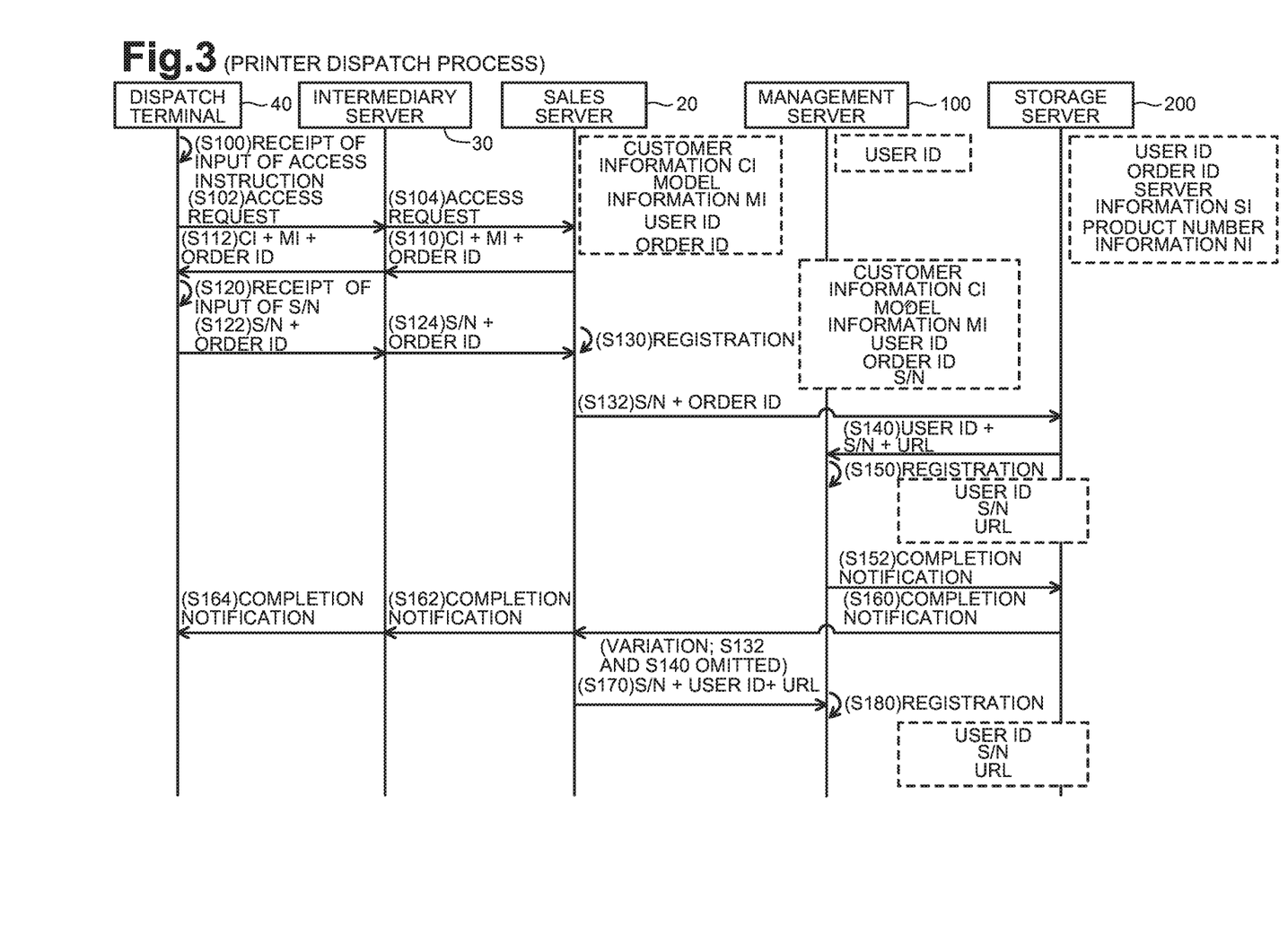
FIG. 3 is a sequence diagram of a printer dispatch process.

In S20, in response to receipt of the purchase request from the user terminal 10 in S10, the sales server 20 registers the customer information CI and the model information MI, both of which are included in the purchase request, in a memory (not illustrated) of the sales server 20 in association with each other. Each box indicated by a dashed line represents information to be registered and the location of the box with the dashed line does not necessarily mean that the information is stored in the server where the box is located. In FIG. 3 and subsequent drawings, such information is represented in the same manner. Subsequently, in S22, the sales server 20 transmits a user registration request for requesting user registration to the management server 100.

In S30, in response to receipt of the user registration request from the sales server 20 in S22, the management server 100 generates and registers a user ID in the memory 114. The user ID is a unique ID for identifying a corresponding user. Subsequently, in S32, the management server 100 transmits the user ID to the sales server 20.

In S40, in response to receipt of the user ID from the management server 100 in S32, the sales server 20 registers the user ID in the memory of the sales server 20 in association with the customer information CI and the model information MI. Subsequently, in S42, the sales server 20 transmits a screen request including the user ID and the model information MI to the storage server 200. The screen request may be a command for requesting transmission of image data representing a selection screen for enabling selection of one or more product numbers of consumable components that can be used in the printer 50.

In S50, in response to receipt of the screen request from the sales server 20 in S42, the storage server 200 registers the user ID included in the screen request, in the memory 214. Subsequently, the storage server 200 determines a plurality of product numbers for identifying varieties of consumable components that can be used in the printer 50, using the model name of the printer 50 indicated by the model information MI included in the screen request, and generates screen data representing a selection screen including the plurality of product numbers. In S52, the storage server 200 transmits the screen data to the sales server 20.

In S54, in response to receipt of the screen data from the storage server 200 in S52, the sales server 20 transmits the screen data to the user terminal 10.

In S60, in response to receipt of the screen data from the sales server 20 in S54, the user terminal 10 displays the selection screen represented by the screen data. Subsequently, in S62, the user terminal 10 receives input of a selection instruction for selecting one or more product numbers from the plurality of product numbers included in the selection screen. In response to this, in S64, the user terminal 10 transmits, to the sales server 20, product number information NI indicating the one or more selected product numbers.

In S66, in response to receipt of the product number information NI from the user terminal 10 in S64, the sales server 20 transmits a service registration request to the storage server 200. The service registration request may be a command for requesting registration for a service of delivering cartridges whose product numbers may include one or more varieties indicated by the product number information NI.

In S70, in response to receipt of the service registration request from the sales server 20 in S66, the storage server 200 generates an order ID that is a unique ID for identifying the service registration request. Subsequently, in S72, the storage server 200 registers the order ID, server information SI, the product number information NI included in the service registration request, in the memory 214, in association with the user ID. The server information SI may be used later for performing communication with the sales server 20. The server information SI includes, for example, a server name and a uniform resource locator ("URL") of the sales server 20. Subsequently, in S74, the storage server 200 transmits the order ID to the sales server 20.

In S80, in response to receipt of the order ID from the storage server 200 in S74, the sales server 20 registers the order ID in the memory of the sales server 20 in association with the customer information CI, the model information MI, and the user ID. Subsequently, in S82, the sales server 20 transmits a completion notification to the user terminal 10. The completion notice indicates that the user registration and the service registration have been completed. Thus, the purchasing process is completed.

(Printer Dispatch Process; FIG. 3)

Hereinafter, referring to FIG. 3, a process to be executed subsequent to the purchasing process of FIG. 2, during preparation for dispatch of the printer 50 by the EC site company, will be described. At this moment, the printer 50 is not connected to the Internet 6.

In S100, the dispatch terminal 40 receives input of an access instruction for accessing the sales server 20 provided by a staff member of the EC site company. In response to this, in S102, the dispatch terminal 40 transmits, to the intermediary server 30, an access request for requesting access to the sales server 20.

In S104, in response to receipt of the access request from the dispatch terminal 40 in S102, the intermediary server 30 further transmits the access request to the sales server 20.

In S110, in response to receipt of the access request from the intermediary server 30 in S104, the sales server 20 transmits the customer information CI, the model information MI, and the order ID to the intermediary server 30.

In S112, in response to receipt of all the pieces of information (i.e., the customer information CI, the model information MI, and the order ID) from the sales server 20 in S110, the intermediary server 30 further transmits all the pieces of information to the dispatch terminal 40.

In a step (not illustrated) subsequent to S112, in response to receipt of all the pieces of information (i.e., the customer information CI, the model information MI, and the order ID) from the intermediary server 30 in S112, the dispatch terminal 40 displays all the pieces of information. The staff member of the EC site company obtains the printer 50 to be dispatched to the user by referring to the model information MI. Then, the staff member prepares for dispatch of the printer 50 to the user using the user name and address indicated by the customer information CI. In the dispatch preparation stage, in step S120, the dispatch terminal 40 receives input of a serial number (hereinafter, referred to as the "S/N") from the staff member. The S/N is a unique ID for identifying the printer 50. For example, in a case where the S/N is indicated on a box for packing the printer 50, the staff member may enter the S/N indicated on the box into the dispatch terminal 40. In another example, in a case where a barcode corresponding to the S/N is indicated on the box for packing the printer 50, the staff member may uses a barcode reader connected to the dispatch terminal 40 to read the barcode to enter the S/N into the dispatch terminal 40. In S122, the dispatch terminal 40 transmits the S/N and the order ID received in S112 to the intermediary server 30.

In S124, in response to receipt of the S/N and the order ID from the dispatch terminal 40 in S122, the intermediary server 30 further transmits the S/N and the order ID to the sales server 20. Nevertheless, in other embodiments, for example, the intermediary server 30 might not necessarily be provided. In this case, the communication of the access request in S102, the communication of the information pieces in S110, and the communication of the information pieces in S122 may be implemented without the intermediary server 30.

In S130, in response to receipt of the S/N and the order ID from the intermediary server 30 in S124, the sales server 20 registers the S/N in the memory of the sales server 20 in association with the order ID. Thus, in the sales server 20, the customer information CI, the model information MI, the user ID, the order ID, and the S/N are associated with each other. Subsequently, in S132, the sales server 20 transmits the S/N and the order ID to the storage server 200.

In response to receipt of the S/N and the order ID from the sales server 20 in S132, the storage server 200 extracts the user ID associated to the received order ID from the memory 214. Subsequently, the storage server 200 generates a callback URL (hereinafter, simply referred to as the "URL") that indicates a location of all the pieces of information (i.e., the user ID, the server information SI, and the product number information NI) associated to the order ID in the memory 214. In S140, the storage server 200 transmits the extracted user ID, the S/N received in S132, and the generated URL to the management server 100.

In S150, in response to receipt of all the pieces of information (i.e., the user ID, the S/N, and the URL) from the storage server 200 in S140, the management server 100 registers the S/N and the URL in the memory 114 in association with the user ID. Thus, in the management server 100, the user ID, the S/N, and the URL are associated with each other. As described above, the URL indicates the location of all the pieces of information (i.e., the user ID, the server information SI, and the product number information NI), which are stored in the storage server 200, in the memory 214. Therefore, associating the S/N and the URL with each other in the management server 100 in S150 is equivalent to associating the S/N stored in the management server 100 with the all the pieces of information stored in the storage server 200. Subsequently, in S152, the management server 100 transmits a completion notification to the storage server 200. The completion notification indicates that the registration of the S/N has been completed.

In S160, in response to receipt of the completion notification from the management server 100 in S152, the storage server 200 transmits the completion notification to the sales server 20. Therefore, in S162 and S164, the completion notification is transmitted to the dispatch terminal 40 from the sales server 20 via the intermediary server 30. Thus, the printer dispatch process is completed.

Figure 4:
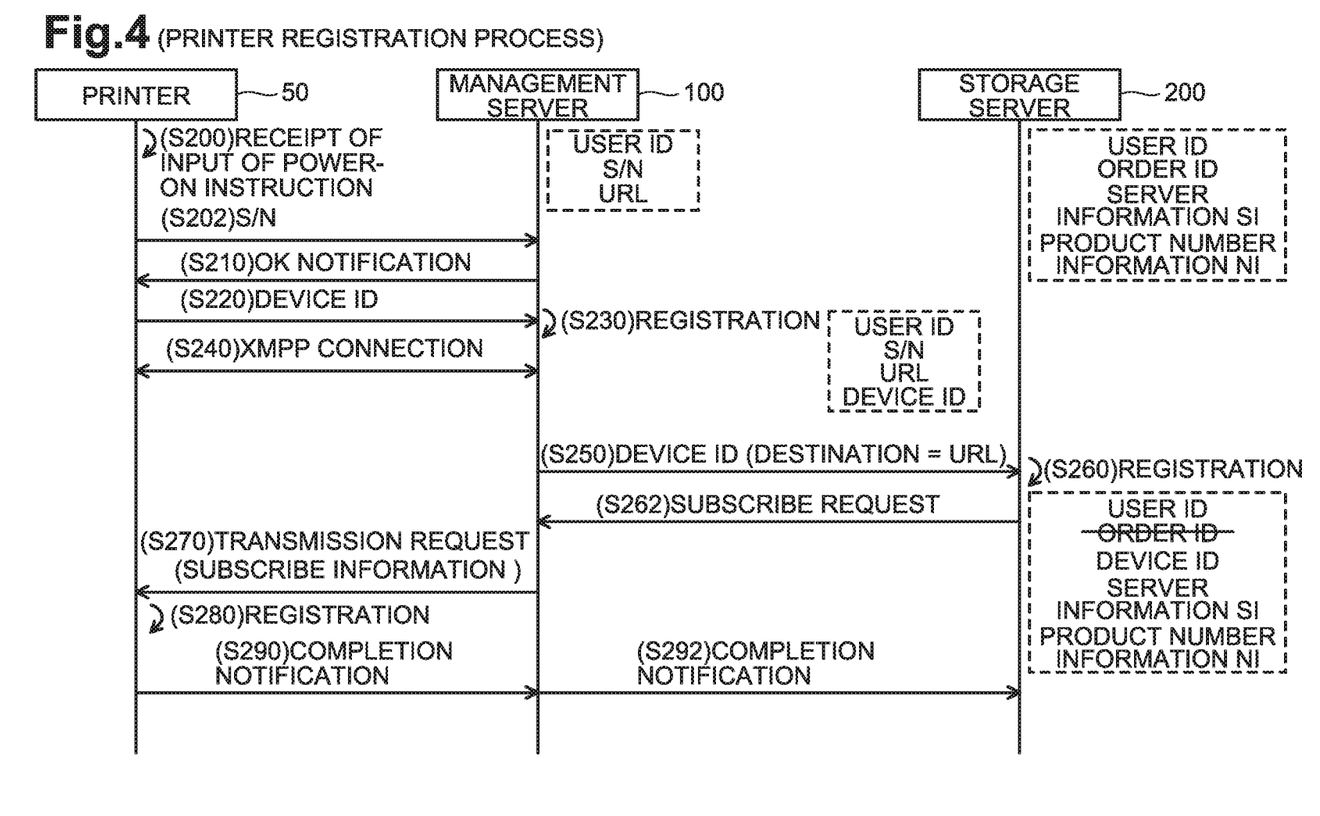
FIG. 4 is a sequence diagram of a printer registration process.

(Printer Registration Process; FIG. 4)

Hereinafter, referring to FIG. 4, a process to be executed when the first-time connection of the printer 50 to the Internet 6 is established subsequent to the printer dispatch process of FIG. 3 will be described.

In S200, the printer 50 receives user input of a power-on instruction for turning the power on. In response to connection of a LAN cable to the printer 50 or in response to an operation event for connecting the printer 50 to a wireless LAN, the printer 50 is connected to the Internet 6. In S202, in response to connection of the printer 50 to the Internet 6, the printer 50 transmits its S/N prestored in the printer 50 to the management server 100. That is, the printer 50 transmits the S/N to the management server 100 automatically without requiring the user to input any letters and/or numerals constituting the S/N and/or to perform any operation for instructing transmission of the S/N. Nevertheless, in other embodiments, for example, the printer 50 may be configured to, in response to receipt of a user's button operation for instructing transmission of the S/N, transmit the S/N prestored in the printer 50 to the management server 100. In still other embodiments, for example, an external memory (e.g., a USB memory) may be packed together with the printer 50, and the printer 50 may be configured to, in response to connection of the external memory to the printer 50, transmit the S/N of the printer 50 stored in the external memory to the management server 100.

In response to receipt of the S/N from the printer 50 in S202, the management server 100 determines whether the same S/N has already been registered in the memory 114. In S210, in response to determination that the same S/N has already been registered, the management server 100 transmits an OK notification to the printer 50.

In S220, in response to receipt of the OK notification from the management server 100 in S210, the printer 50 transmits its device ID prestored in the printer 50 to the management server 100. The device ID is a unique ID for identifying the printer 50 and differs from the S/N.

In S230, in response to receipt of the device ID from the printer 50 in S220, the management server 100 registers the device ID in the memory 114 in association with the S/N received in S202. Thus, in the management server 100, the user ID, the S/N, the URL, and the device ID are associated with each other. In subsequent steps, the device ID, instead of the S/N, will be used as identification information for identifying the printer 50. The S/N may be indicated on the box for packing the printer 50 or may be looked by the staff member of the EC site company. That is, the S/N is information that may be known by anyone who is not the user of the printer 50. In this embodiment, such information with lower security is not used in subsequent steps. Alternatively, the device ID having less chance of being known by a person who is not the user of the printer 50 is used in the subsequent steps. This may therefore enhance the security of the consumable components delivery service.

Subsequently, communication for establishing an extensible messaging and presence protocol ("XMPP") connection that is a so-called always-on connection is performed between the printer 50 and the management server 100, and the XMPP connection is established therebetween in S240. This may thus enable information transmission to the printer 50 from the management server 100 on the Internet 6 via the XMPP connection without the printer 50 transmitting any request to the management server 100.

Although not illustrated in any drawings, in a case where the printer 50 fails to receive an OK notification for some reason in response to transmission of the S/N in S202, the printer 50 repeats transmission of the S/N. In one example, if transmission of the S/N from the printer 50 to the management server 100 is not appropriately completed after the elapse of a predetermined period of time since the printer 50 was delivered to the user, a confirmation mail that may prompt registration of the printer 50 in the management server 100 may be sent to an email address included in the customer information CI stored in the sales server 20, as a destination address.

Although not illustrated in any drawings, in response to determination that the same S/N as the S/N received in S202 has not been registered in the memory 114, the management server 100 transmits an NG notification to the printer 50. In this case, the printer 50 ends the function for communicating with the management server 100, without repeating transmission of the S/N.

In S240, in response to establishment of the XMPP connection, the management server 100 receives the URL associated to the device ID registered in S230. In S250, the management server 100 transmits the device ID to the storage server 200 by specifying the URL as a destination.

In S260, in response to receipt of the device ID whose destination is the URL from the management server 100 in S250, the storage server 200 registers the device ID in the memory 214 in association with all the pieces of information (i.e., the user ID, the server information SI, and the product number information NI) stored in the location indicated by the URL. The order ID will not be used in subsequent steps. Therefore, the storage server 200 erases the order ID from the memory 214 (as indicated in FIG. 4 with a line through order ID). That is, in S260, the storage server 200 registers the device ID as a replacement for the order ID. Thus, in the storage server 200, the user ID, the device ID, the server information SI, and the product number information NI are associated with each other. Subsequently, in S262, the storage server 200 transmits a subscribe request to the management server 100. The subscribe request may be a command for requesting the management server 100 to transmit a transmission request to the printer 50.

In S270, in response to receipt of the subscribe request from the storage server 200 in S262, the management server 100 transmits a transmission request including subscribe information to the printer 50 through the XMPP connection established in S240. The subscribe information includes information identifying the consumable component information to be transmitted to the management server 100 (e.g., information indicating a cartridge) and information indicating a transmission timing of the consumable component information (e.g., a transmission cycle, and a transmission time). As described above, the subscribe information is transmitted to the printer 50. This may achieve the periodic transmission of the consumable component information to the management server 100 from the printer 50.

In S280, in response to receipt of the transmission request from the management server 100 in S270, the printer 50 registers the subscribe information included in the transmission request, in a memory (not illustrated) of the printer 50. In response to this, the printer 50 starts a process for transmitting, to the management server 100, consumable component information at the timing specified by the subscribe information. The consumable component information indicates a remaining life of the consumable component (e.g., a remaining amount of ink in an ink cartridge) specified by the subscribe information. Subsequently, in S290, the printer 50 transmits a completion notification to the management server 100. The completion notification indicates that registration of the subscribe information has been completed.

In S292, in response to receipt of the completion notification from the printer 50 in S290, the management server 100 further transmits the completion notification to the storage server 200. Thus, the printer registration process is completed.

Figure 5:
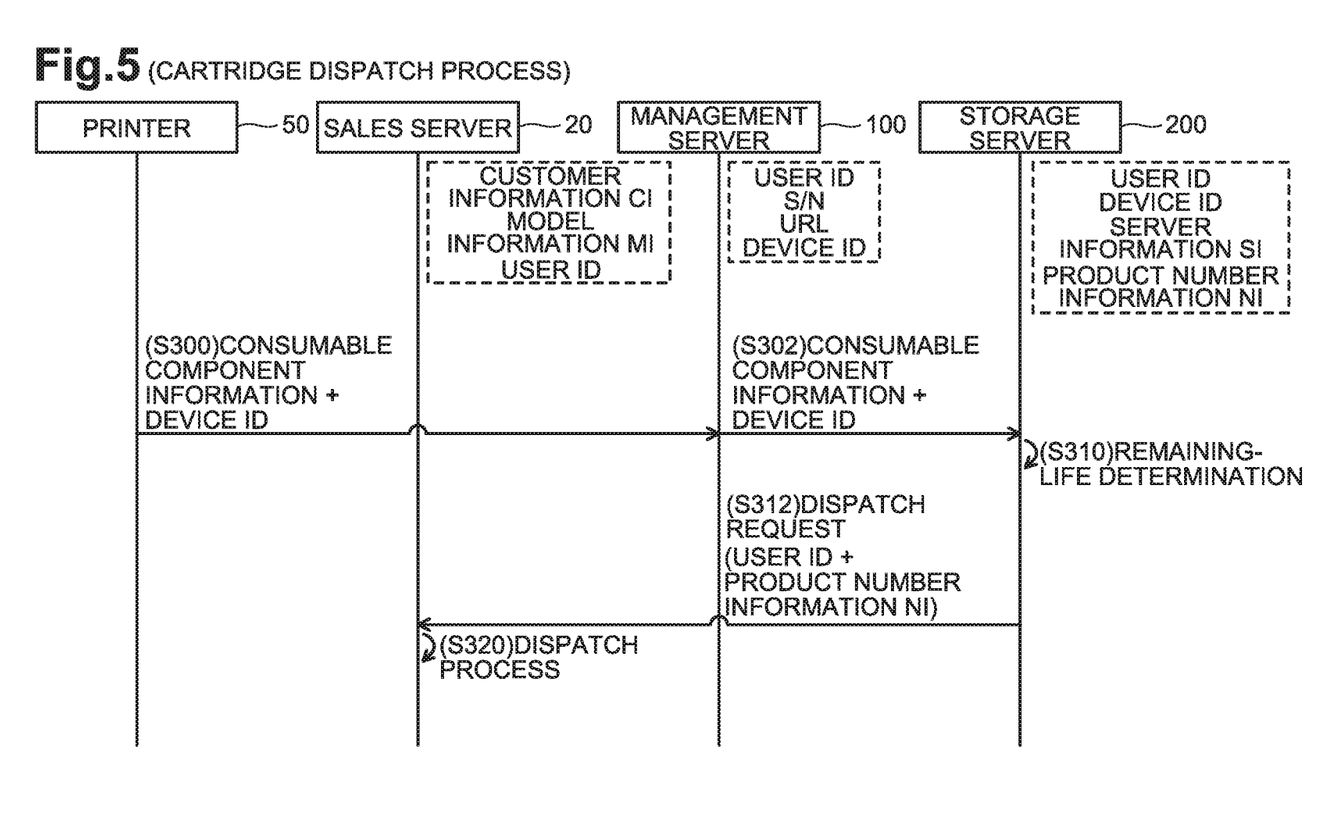
FIG. 5 is a sequence diagram of a cartridge dispatch process.

(Cartridge Dispatch Process; FIG. 5)

Hereinafter, referring to FIG. 5, a process to be executed subsequent to the printer registration process of FIG. 4, during preparation for dispatch of a cartridge to the user, will be described. At this moment, the printer 50 is connected to the Internet 6.

In S300, the printer 50 transmits the consumable component information and the device ID of the printer 50 to the management server 100 in accordance with the subscribe information registered in S280 of FIG. 4. The consumable component information indicates the remaining life of the consumable component currently used in the printer 50.

In S302, in response to receipt of the consumable component information and the device ID from the printer 50 in S300, the management server 100 transmits the consumable component information and the device ID to the storage server 200.

In S310, in response to receipt of the consumable component information and the device ID from the management server 100 in S302, the storage server 200 determines whether the remaining life indicated by the consumable component information is less than or equal to a predetermined level. In response to determination that the remaining life is more than the predetermine level, the storage server 200 does not execute subsequent steps. In response to determination that the remaining life is less than or equal to the predetermined level, the storage server 200 extracts the user ID, the server information SI, and the product number information NI, all of which are associated to the device ID received in S302, from the memory 214. Subsequently, in S312, the storage server 200 transmits a dispatch request including the user ID and the product information NI to the sales server 20 indicated by the server information SI. The dispatch request may be a command for requesting the sales server 20 to dispatch one or more target cartridges.

In S320, in response to receipt of the dispatch request from the storage server 200 in S312, the sales server 20 executes a dispatch process for accepting a purchase request of one or more new cartridges and dispatching the one or more new cartridges. More specifically, for example, the sales server 20 extracts the customer information CI associated to the user ID included in the dispatch request, from the memory of the sales server 20. Then, the sales server 20 settles a purchase price of the one or more cartridges specified by the product number information NI included in the dispatch request, using the billing information (e.g., the credit card information) included in the customer information CI. Subsequently, the sales server 20 prepare for dispatch of the one or more cartridges with specifying the user name and address indicated by the customer information CI. In response to this, the staff member of the EC site company dispatches the one or more cartridges. Thus, the cartridge dispatch process is completed.

Nevertheless, in other embodiments, for example, in S312, the storage server 200 may transmit the dispatch request to the printer 50 via the management server 100. In this case, the printer 50 may transmit the dispatch request to the sales server 20. This may also cause the sales server 20 to execute the dispatch process.

Effects of Embodiment

According to the above-described configuration, under circumstances where each of the servers 100 and 200 provided by the vendor of the printer 50 are not communicable with the printer 50 via the Internet 6, in response to receipt of the S/N of the printer 50 from the dispatch terminal 40 (e.g., S122 and S124 of FIG. 3), each of the servers 100 and 200 may register ones of the user ID, the server information SI, the product number information NI, and the S/N in association with each other via the callback URL (e.g., step S150). That is, each of the servers 100 and 200 may register S/N and other pieces of information for the user to obtain the consumable components delivery service, in association with each other, before the user connects the printer 50 to the Internet 6 after obtained the printer 50 from the EC site company. In response to receipt of the S/N that is the same as the already-registered S/N from the printer 50 after the printer 50 is connected to the Internet 6 by the user (e.g., S202 of FIG. 4), each of the servers 100 and 200 registers the device ID (e.g., S230 or S260) and transmits the subscribe information to the printer 50 (e.g., S262 or S270). Thus, in response to receipt of the consumable component information and the device ID from the printer 50 (e.g., S300 of FIG. 5), each of the servers 100 and 200 may cause the sales server 20 to provide the consumable components delivery service (e.g., S310 or S312). Therefore, once the user inputs an instruction for purchasing the printer 50 and connects the printer 50 to the Internet 6, the user may receive the consumable components delivery service with no need for the user to perform inputting the S/N number manually on the printer 50. According to this embodiment, user convenience may be enhanced.

More specifically, the following improvements can be achieved. (1) The user can input a plurality of the information (e.g. customer information CI and model information MI) on the terminal 10 at once before the printer 50 is connected to the Internet 6. Therefore, it may be easier to input the plurality of the information for the user compared to that the user has to input a part of the plurality of the information after the printer 50 is connected to the Internet. (2) Each of the servers 100 and 200 receives the S/N from the printer 50. Thus, the user does not need to input the S/N manually. Therefore, each of the servers 100 and 200 can receive the S/N automatically. Besides, it is prevented the user from forgetting to input the S/N. (3) Each of the servers 100 and 200 receives the S/N from the sales server 20 in response to inputting the S/N by the staff member of the EC site company into the dispatch terminal 40. Therefore, the number of user's operation events that may be burdensome to the user can be reduced. (4) Each of the servers 100 and 200 receives the S/N from each of the sales server 20 and the printer 50. Therefore, the each of the server 100 and 200 can check the S/N appropriately.

(Correspondences)

A combination of the management server 100 and the storage server 200 is an example of a "server". The memory 214 of the storage server 200 is an example of a "first memory". The memory 114 of the management server 100 is an example of a "second memory". The sales server 20 is an example of a "service providing server". The printer 50 is an example of a "target device". The user terminal 40 is an example of a "purchaser's terminal". The dispatch terminal 40 is an example of a "vendor's terminal". The user ID is an example of "user identification information". The S/N is an example of "first device identification information". The device ID is an example of "second device identification information". The order ID is an example of "registration identification information". The server information SI and the product information NI is an example of "service information". The consumable component information is an example of "related information". The product number information NI is an example of "consumable component identification information". The URL is an example of "location information". The selection instruction in S62 of FIG. 2 is an example of a "service registration instruction".

While the embodiment of the present disclosure has been described in detail, this is merely an example and does not limit the scope of the appended claims. Technique disclosed in the scope of the claims includes various changes, arrangement and modifications of the embodiment. Hereinafter, example variations of the above-described embodiment will be described.

(First Variation)

The "server" might not necessarily consist of two servers (e.g., the servers 100 and 200), and may consist of a single server (e.g., the management server 100). In this case, for example, the screen request (e.g., S42 of FIG. 2) is transmitted from the sales server 20 to the management server 100 and the processing of S50 is omitted. The screen data (e.g., S52) is transmitted from the management server 100 to the sales server 20, and the service registration request (e.g., S66) is transmitted from the sales server 20 to the management server 100. The management server 100 executes the processing of S70 to register the user ID, the order ID, the server information SI, and the product number information NI in the memory 114 in association with each other. The order ID (e.g., S74) is transmitted from the management server 100 to the sales server 20. The processing of S132 to S160 of FIG. 3 and the processing of S250, S262, and S292 of FIG. 4 are not executed. The processing of S302 of FIG. 5 is also not executed. The management server 100 executes the processing of S310 and S312 of FIG. 5. In this variation, the management server 100 is another example of the "server". The memory 114 is another example of the "first memory" and the "second memory". That is, the "first memory" and the "second memory" may be the same memory. In this variation, the processing of S32 and the processing of S42 may be omitted.

(Second Variation)

The sales server 20 may generate a user ID prior to execution of the processing of S22 of FIG. 2, and in S22, may transmit a user registration request including the generated user ID to the management server 100. In this case, in S30, the management server 100 does not generate a user ID but registers, in the memory 114, the received user ID included in the user registration request. In this variation, the processing of S30 may be omitted.

(Third Variation)

In a case where the storage server 200 receives a service registration request including information on another EC site server that is different from the sales server 20 in S66 of FIG. 2, in S72, the storage server 200 may register the information on the other EC site server as the server information SI. In this case, in S312 of FIG. 5, the storage server 200 transmits a dispatch request to the other EC site server instead of the sales server 20 and causes the other EC site server to provide the cartridge delivery service. That is, in one example, the "service providing server" and the "sales server" may be the same server as disclosed in the above-described embodiment, and in another example, may be respective different servers as disclosed in this variation.

(Fourth Variation)

In the above-described embodiment, in response to input of a purchase instruction in S10 of FIG. 2, the user ID is registered in each of the servers 100 and 200 (e.g., S30 or S50). Alternatively, in response to input of a predetermined instruction for registering the user ID in each of the servers 100 and 200 after the printer 50 is purchased by the user, the user terminal 10 may access the management server 100 to transmit a user registration request to the management server 100. In response to receipt of the user registration request from the user terminal 10, the management server 100 may execute the processing of S22 and subsequent steps. In one example, in the processing of S22, the user registration request may be received from the sales server as disclosed in the above-described embodiment, and in another example, the user registration request may be received from the purchaser's terminal as disclosed in this variation.

(Fifth Variation)

The information communicated via the sales server 20 in the above-described embodiment might not necessarily be communicated via the sales server 20. For example, instead of executing the processing of S32 of FIG. 2, the management server 100 may transmit the user ID directly to the storage server 200 by bypassing the sales server 20. That is, in the processing of S32, the user identification information may be transmitted directly to the storage server by bypassing the sales server. For example, instead of executing the processing of S62 and S64 of FIG. 2, the management server 100 may receive the product number information NI directly from the user terminal 10 by bypassing the sales server 20. That is, in the processing of S66, the user registration request may be received directly from the purchaser's terminal by bypassing the sales server. For example, instead of executing the processing of S122, S124, and S132 of FIG. 3, the storage server 200 may receive the S/N and the order ID directly from the dispatch terminal 40 by bypassing the sales server 20. That is, in the processing of S132, the first device identification information may be received from the vendor's terminal by bypassing the sales server.

(Sixth Variation)

For example, in response to receipt of the device ID from the printer 50 in S220 of FIG. 4, the servers 100 and 200 may transmit the dispatch request to the sales server 20 periodically without executing the processing of S262 and S270 of FIG. 4 and the processing of S300, S302, and S310 of FIG. 5. That is, the servers 100 and 200 may transmit the dispatch request (e.g., S312) to the sales server 20 without confirming the remaining life of the consumable component currently used in the printer 50. In this variation, the processing of S270 and the processing of S300 may be omitted.

(Seventh Variation)

The processing of S220 and S230 of FIG. 4 might not necessarily be executed. In S250, the S/N instead of the device ID may be transmitted to the storage server 200 and, in S260, the S/N may be registered instead of the device ID. In S300 and S302 of FIG. 5, the S/N instead of the device ID may be transmitted. In this variation, the processing of S220, the processing of S260 and the processing of S250 may be omitted.

(Eighth Variation)

In the above-described embodiment, the information related to the printer 50 is registered in the management server 100 and the storage server 200, and the consumable components delivery service for the user of the printer 50 is implemented by the sales server 20. Alternatively, the management server 100 and the storage server 200 may be provided by a vendor of a terminal, e.g., a PC or a smartphone. In this case, in response to registration of information related to the terminal and receipt of the S/N from the terminal in S202 of FIG. 4, the management server 100 and the storage server 200 may cause the sales server 20 to provide an information providing service for providing the information related to the terminal (e.g., information on new models) to the user. In this variation, the terminal is another example of the "target device". The information providing service is another example of the "service".

(Ninth Variation)

Instead of the processing of S132 and S140 of FIG. 3, a variation illustrated in FIG. 3 may be adopted. That is, in S170, in response to registration of the S/N in S130, the sales server 20 may generate a callback URL and transmit the S/N, the user ID associated to the S/N, and the URL to the management server 100. In S180, in response to receipt of the S/N, the user ID, and the URL from the sales server 20 in S170, the management server 100 may register the S/N, the user ID, and the URL in the memory 114 in association with each other. In this variation, also, the information that may be the same or similar to the information registered in the above-described embodiment may be registered in the management server 100. In this variation, the processing of S140 and the processing of S30 may be omitted.

(Tenth Variation)

In S70 and S72 of FIG. 2, the order ID might not necessarily be generated and registered. In this case, in S110, S112, S122, S124, and S132 of FIG. 3, the user ID instead of the order ID may be transmitted. In this variation, also, the management server 100 may register the information that may be the same or similar to the information registered in the above-described embodiment. Generally speaking, the "registration identification information" might not necessarily be used.

(Eleventh Variation)

Subsequent to execution of the processing of S20 of FIG. 2 and prior to transmission of the user registration request to the management server 100, in S42, the sales server 20 may transmit a screen request including the model information MI but not including the user ID to the storage server 200. In this case, in S52, the storage server 200 transmits screen data to the sales server 20 without executing the processing of S50, and in S66, the storage server 200 receives a service registration request from the sales server 20. In response to this, in S70 and S72, the storage server 200 registers the order ID, the server information SI, and the product number information NI in the memory 214. Subsequent to this, the sales server 20 transmits a user registration request to the management server 100. In response to this, the processing of S30 to S40 are executed and the user ID is transmitted from the sales server 20 to the storage server 200. In this case, the storage server 200 registers the user ID in the memory 214 in association with the order ID. That is, in one example, the "user identification information" may be stored in the first memory prior to registration of the service information in the first memory as described in the above-described embodiment. In another example, the "user identification information" may be stored in the first memory subsequent to registration of the service information in the first memory as described in this variation (Twelfth Variation)

In S140 of FIG. 3, the callback URL might not necessarily be communicated. In this case, in S250 of FIG. 4, the management server 100 may transmit the device ID and the user ID as a substitute for the URL, to the storage server 200. In S260, the storage server 200 may register the device ID in association with the already-received user ID. In this variation, also, in S260, the storage server 200 may register the information that may be similar to the information registered in the above-described embodiment. Generally speaking, the "location information" might not necessarily be used.

(Thirteenth Variation)

In the above-described embodiment, in S10 of FIG. 2, the user is allowed to access the sales server 20 and purchase the printer 50 using the user terminal 10. Alternatively, the user may purchase the printer 50 at a brick-and-mortar store that sells the printer 50 and subscribe the consumable components delivery service. In this case, the staff member of the store may use a store terminal installed at the store and cause the store terminal to transmit a user registration request (refer to S22 of FIG. 2) to the management server 100. The staff member may select a product number of a desired consumable component from the selection screen using the store terminal (refer to S62) and cause the store terminal to transmit a service registration request to the storage server 200 (refer to S66). The staff member may enter an S/N and an order ID in the store terminal (refer to S120 of FIG. 3) and cause the store terminal to transmit the S/N and the order ID to the storage server 200 (refer to S132). With this configuration, once the user purchases the printer 50 at the brick-and-mortar store and subscribes the consumable components delivery service, the user may receive the consumable components delivery service by connecting the printer 50 to the Internet 6. In this variation, the store terminal is another example of the "purchaser's terminal" and the "vendor's terminal". The following variation may be adopted as an alternative to this variation. For example, subsequent to transmission of the S/N to the storage server 200 by the store terminal (refer to S132), the staff member may cause the store terminal to transmit a user registration request including the S/N to the management server 100 (refer to S22 of FIG. 2) and to transmit a service registration request including the S/N the storage server 200 (refer to S66). In this variation, also, the information similar to the information registered in the above-described embodiment may be registered in each of the servers 100 and 200. That is, the timing at which the first device identification information is registered in the processing of S150 may be subsequent to (refer to the above-described embodiment) or prior to (refer to this variation) the timing at which the user identification information is registered in the processing of S50 (and the timing at which the service information is registered in the processing of S72).

(Fourteenth Variation)

In the above-described embodiment and variations, the processing in all steps of FIGS. 2 to 5 is implemented by execution of the program 116 (i.e., software) by the CPU 112 of the server 100 and/or execution of the program 216 (i.e., software) by the CPU 212 of the server 200. Alternatively, the processing in at least one of the steps of FIGS. 2 to 5 may be implemented by hardware, e.g., a logical circuit.

The technical elements described in the specification and the drawings exhibit technical usefulness alone or in various combinations, and not limited to those in the claims at the time of this disclosure. Furthermore, the techniques described as examples in the specification or drawings may achieve a plurality of objects simultaneously, and has technical utility by achieving any one of these objects.

What is claimed is:

1. A server comprising:
a controller configured to perform:
receiving, in a condition where a connection between the server and a target device via the Internet has not been established, a user registration request for requesting a registration of a user of the target device via the Internet;
registering, into a first memory, user identification information for identifying the user of the target device;
receiving, in the condition where the connection between the server and the target device via the Internet has not been established, a service registration request for requesting a registration of a service via the Internet;
registering, into the first memory, service information for receiving a provision of the service from a service providing server, the service information included in the service registration request;
receiving, in the condition where the connection between the server and the target device via the Internet has not been established, a first device identification information for identifying the target device in response to the first device identification information being sent from a vendor's terminal via the Internet;
registering, into a second memory, the first device identification information in association with the user identification information and the service information registered in the first memory after receiving the first device identification information;
receiving, in the condition where the connection between the server and the target device via the Internet has been established for a first time, a device identification information automatically transmitted from the target device via the Internet;
determining whether the device identification information received from the target device matches with the first device identification information registered in the second memory;
after determining that the device identification information matches with the first device identification information, transmitting a notification to the target device which causes the target device to transmit second device identification information;
receiving, after transmitting the notification to the target device, the second device identification information from the target device via the Internet, the second device identification information being pre-stored in the target device and uniquely identifying the target device and being different from the device identification information;
registering, into the first memory, the second device identification information in association with the user identification information and the service information registered in the first memory, the user identification information and the service information being in association with the first device identification information;

after receiving the second device identification information and registering, transmitting a transmitting request to the target device via the Internet, the transmitting request being for requesting the target device to transmit related information related to the service at a transmission timing, the transmitting request including the transmission timing;

receiving according to the transmission timing, the second device identification information and the related information from the target device via the Internet, in response to receiving the related information and the second device identification information from the target device, the controller determines whether the service is needed based on the received related information; and in response to determining that the service is needed based on the received related information from the target device, the controller causes the service providing server to provide the service, the user identification information and the service information are registered in the first memory and are in association with the second device identification information.

2. The server according to claim 1, wherein the service providing server provides the service for delivering a consumable component for the target device to the user, the service information includes consumable component identification information for identifying the consumable component, the related information includes information representing a remaining life of the consumable component installed in the target device, and the controller transmits, to the service providing server, a delivering request including the user identification information and the consumable component identification information via the Internet to cause the service providing server to provide the service in a case where the remaining life of the consumable component represented by the related information is equal to or less than a predetermined value.

3. The server according to claim 1, wherein the controller receives the user registration request from a sales server via the Internet in response to a purchasing instruction for purchasing the target device using the sales server into a purchaser's terminal in the condition where the connection between the server and the target device via the Internet has not been established.

4. The server according to claim 3, wherein the service registration request is received from the sales server, the first device identification information is received from the sales server, the device identification information is received from the target device without passing the sales server.

5. A non-transitory computer readable storage medium storing instructions, the instructions, when executed by a controller of a server, causing the server to perform:

receiving, in a condition where a connection between the server and a target device via the Internet has not been established, a user registration request for requesting a registration of a user of the target device via the Internet;

registering, into a first memory, user identification information for identifying the user of the target device;

receiving, in the condition where the connection between the server and the target device via the Internet has not been established, a service registration request for requesting a registration of a service via the Internet;

registering, into the first memory, service information for receiving a provision of the service from a service providing server, the service information included in the service registration request;

receiving, in the condition where the connection between the server and the target device via the Internet has not been established, a first device identification information for identifying the target device in response to the first device identification information being sent from a vendor's terminal via the Internet;

registering, into a second memory, the first device identification information in association with the user identification information and the service information registered in the first memory after receiving the first device identification information;

receiving, in the condition where the connection between the server and the target device via the Internet has been established for a first time, a device identification information automatically transmitted from the target device via the Internet;

determining whether the device identification information received from the target device matches with the first device identification information registered in the second memory;

after determining that the device identification information matches with the first device identification information, transmitting a notification to the target device which causes the target device to transmit second device identification information;

receiving, after transmitting the notification to the target device, the second device identification information from the target device via the Internet, the second device identification information being prestored in the target device and uniquely identifying the target device and being different from the device identification information;

registering, into the first memory, the second device identification information in association with the user identification information and the service information registered in the first memory, the user identification information and the service information being in association with the first device identification information;

after receiving the second device identification information and registering, transmitting a transmitting request to the target device via the Internet, the transmitting request being for requesting the target device to transmit related information related to the service at a transmission timing, the transmitting request including the transmission timing;

receiving according to the transmission timing, the second device identification information and the related information from the target device via the Internet;

in response to receiving the related information and the second device identification information from the target device, determining whether the service is needed based on the received related information; and in response to determining that the service is needed based on the received related information from the target device, causing the service providing server to provide the service, the user identification information and the service information are registered in the first memory and are in association with the second device identification information.

6. A server comprising:
a controller configured to perform:
  receiving, in a condition where a connection between the server and a target device via the Internet has not been established, a user registration request for requesting a registration of a user of the target device via the Internet;
  registering, into a first memory, user identification information for identifying the user of the target device;
  receiving, in the condition where the connection between the server and the target device via the Internet has not been established, a service registration request for requesting a registration of a service via the Internet;
  registering, into the first memory, service information for receiving a provision of the service from a service providing server, the service information included in the service registration request;
  receiving, in the condition where the connection between the server and the target device via the Internet has not been established, a first device identification information for identifying the target device in response to the first device identification information being sent from a vendor's terminal via the Internet;
  registering, into a second memory, the first device identification information in association with the user identification information and the service information registered in the first memory after receiving the first device identification information;
  receiving, in the condition where the connection between the server and the target device via the Internet has been established for a first time, a device identification information automatically transmitted from the target device via the Internet; and
  determining whether the device identification information received from the target device matches with the first device identification information registered in the second memory,
wherein
  the server includes a management server and a storage server,
  the management server comprises:
    the second memory; and
    a management server-side controller configured to perform:
      the receiving the user registration request;
      transmitting user identification information to the storage server via the Internet;
      the registering the first device identification information; and
      the receiving the device identification information,
  the storage server comprises:
    the first memory; and
    a storage server-side controller configured to perform:
      receiving the user identification information from the management server via the Internet;
      the registering the user identification information, wherein the user identification information is registered into the first memory in response to receiving the user identification information from the management server;
      the receiving the service registration request; and
      the registering the service information;
  at least one of the management server-side controller and the storage server-side controller is configured to perform the receiving the first device identification information,
    in response to receiving the first device identification information from a sales server, the management server-side controller registers, into the second memory, the first device identification information in association with the user identification information and service information registered in the first memory, by registering, into the second memory, the first device identification information in association with location information, the location information being for designating the user identification information and the service information registered in the first memory of the storage server,
  the management server-side controller is further configured to perform:
    transmitting a notification to the target device which causes the target device to transmit second device identification information after determining that the device identification information matches with the first device identification information;
    receiving, after transmitting the notification to the target device, the second device identification information from the target device via the Internet, the second device identification information being different from the first device identification information, the second device identification information being prestored in the target device and uniquely identifying the target device; and
    in response to receiving the device identification information and the second device identification information from the target device, transmitting, to the storage server, the second device identification information in which the location information associated with the first device identification information and registered in the second memory is designated as a destination,
  the storage server-side controller is further configured to perform:
    receiving the second device identification information in which the location information is designated as the destination; and
    in response to receiving the second device identification information from the management server, registering, into the first memory, the second device identification information in association with the user identification information and the service information registered in the first memory, the user identification information and the service information being designated by the location information,
  wherein the controller of the server is further configured to perform
    after the second device identification information is registered,
      causing the service providing server to provide the service to the user using the user identification information and the service information in the first memory, the user identification information and the service information being in association with the second device identification information and wherein the storage server-side controller configured to perform the causing of the service providing server to provide the service.

7. The server according to claim 6, wherein
the storage server-side controller is configured to perform the receiving the first device identification information,
the storage server-side controller is further configured to perform:
   in response to receiving the first device identification information from the sales server, transmitting the first device identification information and the user identification information registered in the first memory to the management server,
the management server-side controller is further configured to perform:
registering, into the second memory, the user identification information; and
   receiving the first device identification information and the user identification information from the storage server via the Internet,
in response to receiving the first device identification information and the user identification information from the storage server, the management server-side controller registers, into the second memory, the first device identification information in association with the user identification information registered in the second memory.

8. The server according to claim 7, wherein
in response to receiving the service registration request, the storage server-side controller registers, in the first memory, the service information and registration identification information for identifying the service registration request,
the storage server-side controller receives the first device identification information and the registration identification information from the sales server via the Internet,
in response to receiving the first device identification information and the registration identification information from the sales server, the storage server-side controller transmits the first device identification information and the user identification information via the Internet to the management server, the user identification information being registered in the first memory and being in association with the registration identification information.

9. The server according to claim 6, wherein
the storage server-side controller receives the service registration request via the Internet after registering the user identification information into the first memory,
in response to receiving the service registration request, the storage server-side controller registers, into the first memory, the service information in association with the user identification information.

\* \* \* \* \*